United States Patent [19]

Campbell et al.

[11] Patent Number: 4,668,133
[45] Date of Patent: May 26, 1987

[54] BORING BAR ASSEMBLY

[75] Inventors: Ira J. Campbell, East Bradford Township, Chester County; John L. Morris, Jr., Ridley Township, Delaware County; Thomas J. Whalen, Philadelphia; Frederick R. Fields, North Hill, all of Pa.; Herbert Klingenhoff, Kentwood, Mich.

[73] Assignee: Westinghouse Electric Corp., Pittsburgh, Pa.

[21] Appl. No.: 782,668

[22] Filed: Oct. 1, 1985

[51] Int. Cl.[4] .................. B23B 45/14; B23B 47/02
[52] U.S. Cl. .................. 408/81; 82/1.2; 82/2 E; 408/125; 408/141
[58] Field of Search .................. 408/72, 77, 78, 80, 408/81, 82, 83, 111, 114, 158, 709, 124, 125, 141, 142, 180, 187; 82/1.2, 2 E, 4 C; 409/204, 206, 208, 209

[56] References Cited

U.S. PATENT DOCUMENTS

| | | | |
|---|---|---|---|
| 1,220,399 | 3/1917 | Cowell | 408/82 X |
| 2,065,486 | 12/1936 | Albertson | 408/82 |
| 2,871,730 | 2/1959 | Gremp | 408/77 |
| 3,145,622 | 8/1964 | Rust et al. | 408/77 X |
| 3,880,544 | 4/1975 | Papadopulus | 408/111 |
| 3,966,348 | 6/1976 | Burgsmuller | 408/180 |
| 4,096,771 | 6/1978 | Monro | 408/83 X |
| 4,176,565 | 12/1979 | Christoph | 82/4 C X |
| 4,186,630 | 2/1980 | Lindhag | 82/4 C |

FOREIGN PATENT DOCUMENTS

| | | | |
|---|---|---|---|
| 2353242 | 4/1975 | Fed. Rep. of Germany | 408/82 |
| 8203032 | 9/1982 | Japan | 82/1.2 |

Primary Examiner—Eugene F. Desmond
Assistant Examiner—Glenn L. Webb
Attorney, Agent, or Firm—F. J. Baehr

[57] ABSTRACT

A boring bar assembly for boring large diameter turbine bores in the field, the assembly utilizing a small hydraulic motor which drives a boring bar through an in line double reduction gear drive with a reduction ratio in excess of 100:1 and an output shaft which compensates for as much as 6° angular misalignment between the boring bar and the output shaft of the gear box.

4 Claims, 3 Drawing Figures

4,668,133

BORING BAR ASSEMBLY

BACKGROUND OF THE INVENTION

This invention relates to boring bar assemblies and more particularly to such assemblies utilized in the field to rebore large diameter bores in machinery particularly steam turbines.

Large diameter boring apparatus heretofore used in the field utilized worm gears to provide high torque at low speed. As diameters increased further speed reductions and increased torque were required to keep the cutting tool at the proper speed. Belt drives with various sized pulleys or sheaves were utilized along with motor controls and were not completely satisfactory as they resulted in overheated and overloaded worm gears. Larger diameter worm gears could only be used in select applications. Alignment of the various drive components in the field was excessive at times B 30% of the time spent on a bore was spent on aligning the drive mechanism.

SUMMARY OF THE INVENTION

In general, a boring bar assembly for boring large diameter bores in a machine in the field, when made in accordance with this invention, comprises a base plate adapted to be affixed to the machine, a double reduction gear box mounted on the base plate and having an input shaft and an output shaft, a boring bar attached to the output shaft, means for driving the input shaft, self aligning bearings for rotatably supporting the boring bar within the machine and a balanced compound head mounted on the boring bar and having a tool holder and cutting tool which can be moved manually axially and radially with respect to the boring bar.

BRIEF DESCRIPTION OF THE DRAWINGS

The objects and advantages of this invention will become more apparent by reading the following detailed description in conjunction with the accompanying drawings, in which.

DESCRIPTION OF THE PREFERRED EMBODIMENT

Figure 1:
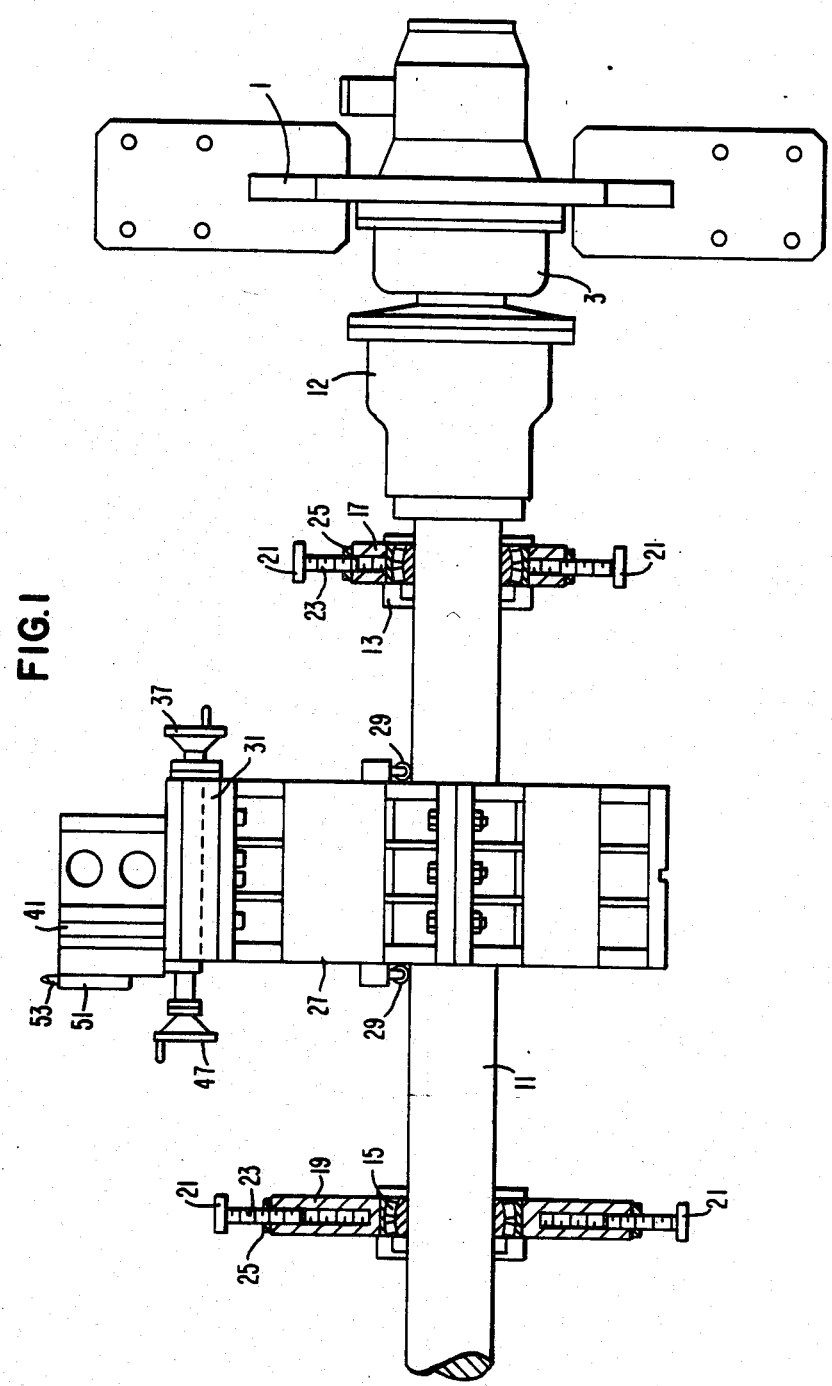
FIG. 1 is an elevational view partially in section of a boring bar assembly made in accordance with this invention.

Referring now to the drawings in detail and in particular to FIG. 1 there is shown a boring bar assembly for machining large diameter bores, up to 15 feet in diameter in machinery such as steam turbines. The assembly is for use in the field where large boring mills are not available. The assembly comprises a base plate 1 adapted to be affixed to a turbine or other machine. Mounted on the base plate is a double reduction gear box 3 having an input shaft 5 and output shaft 7. A hydraulic motor 9 or other drive means is connected to the input shaft 5 providing the power to operate a boring bar 11 connected to the output shaft 7 by a shaft adapter 12.

The boring bar 11 is rotatably supported by self-aligning bearings 13 and 15 each of which has arms 17 and 19, respectfully, which extend radially from at least three sides thereof. The arms 17 and 19 each have feet 21 which are radially adjustable utilizing studs 23 and nuts 25 or other adjustable means in order to align the boring bar with the axis of the bore in the turbine or machine. The arms 19, as shown, are larger than the arms 17 whereby the arms 19 fit into larger diameter portions of the turbine or machine than the arms 17. A counter balanced compound head 27 is disposed on the boring bar 11 and has rollers 29 attached thereto to allow the compound head 27 to be moved axially on the boring bar 11. Keys and keyways (not shown) prevent the compound head from rotating with respect to the boring bar 11 and means are provided for clamping the compound head 27 in a fixed position on the boring bar 11.

Figure 2:
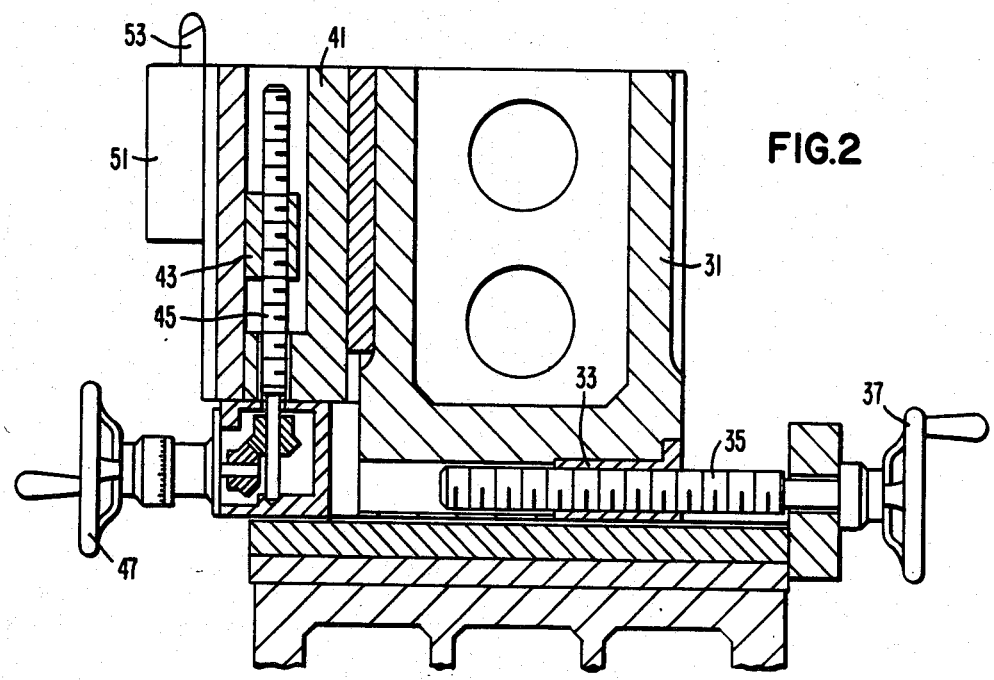
FIG. 2 is an enlarged sectional view of a portion of the compound head.

As shown best in FIG. 2 the compound head 27 has a first movable member 31 which is moved axially by a threaded thimble 33, lead screw 35 and wheel 37 which is turned manually to rotate the lead screw 35. A second movable member 41 is mounted on the first movable member 31 and has a threaded thimble 43, lead screw 45 and wheel 47 which is turned manually to move the second movable member 41 radially with respect to the boring bar 11. Mounted on the second movable member 41 is a tool holder 51 and cutting tool 53.

Figure 3:
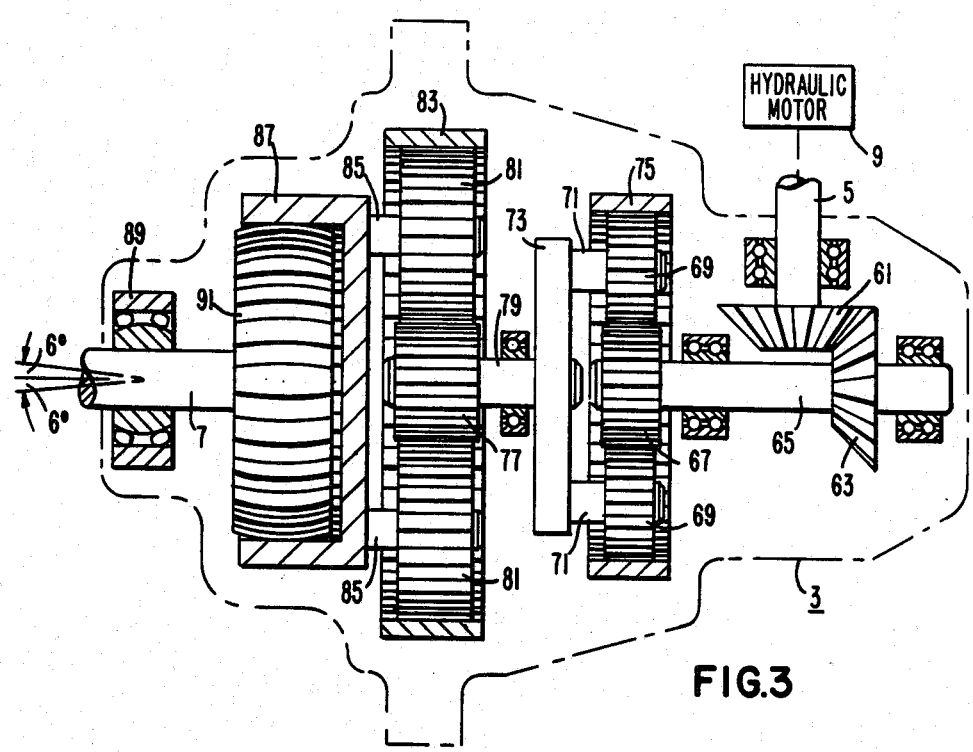
FIG. 3 is a schematic view of a gear train used in this invention.

As shown schematically in FIG. 3 the input shaft 5 of the double reduction gear box 3 has a pair of bevel gears 61 and 63 cooperatively associated therewith to transmit power from the motor 9 which is mounted at right angles to the boring bar 11 to a shaft 65 generally aligned with the boring bar 11. Mounted on the shaft 65 is a gear train which comprises a pinion gear 67 which engages a plurality of idle gears 69. In the preferred embodiment three idlers are utilized however for simplicity the schematic shows two idlers. The idlers 69 are rotatably mounted on shafts 71 which are attached to a rotatable carriage 73 the idlers 69 also engage a stationary ring gear 75 having internal teeth. A pinion gear 77 is connected to the carriage 73 by a shaft 79. A plurality of idler gears 81 engage the pinion gear 77 and a ring gear 83 and are rotatably disposed on shafts 85 which are connected to a rotatable carriage 87. The output shaft 7 is mounted in a self-aligning bearing 89 and has a hub 91 with splines that interdigitate with splines in the carriage 87 allowing the output shaft 7 to wobble generally in the range of ±6° to provide for misalignment between the gear box and the boring bar 11.

The use of the double reduction concentric reduction gears provides an overall size which fits any field location where machining large diameter bores is required and allows the use of a simple fabricated support plate. The in line double reduction gear box generally provides 150:1 reduction ratios which facilitate the use of a relatively small motor and power supply to machine bores which may be as large as 15 feet in diameter. The self-aligning feature of the output shaft permits up to 6° of angular misalignment between the gear box and the boring bar simplifying field installation and substantially reducing set up time.

What is claimed is:

1. A boring bar assembly for boring large diameter bores in a machine in the field, said boring assembly comprises:

a base plate adapted to be affixed to the machine;

a double reduction gear box mounted on said base plate and having a gear train, an input shaft, an output shaft and a spline connected to said output shaft which interdigitates with a spline in a carriage connected to said gear train to generally allow ±6° of misalignment between the gear train aand the output shaft;

a boring bar attached to said output shaft;

means for driving said input shaft;

self-aligning bearing means for rotatingly supporting said boring bar within said machine; and a balanced compound head movably mounted on said boring bar and having a first movable member mounted thereon, a second movable member mounted on said first movable member and a cutting tool holder and cutting tool mounted on said second movable member said first and second movable members being cooperatively associated to move the cutting tool axially and radially with respect to said boring bar, whereby said cutting tool may be moved axially and radially to make smooth cuts in a large diameter bore in said machine in the field.

2. A boring bar assembly as set forth in claim 1, wherein the self-aligning bearing means having a plurality of adjustable pads which can be moved radially to align the boring bar with the center of the bore in the machine.

3. A boring bar assembly as set forth in claim 1, wherein the compound head has rollers disposed to engage the boring bar to permit moving the compound head axially on the boring bar and clamping means for fixing the compound head at a predetermined position on the boring bar.

4. A boring bar assembly as set forth in claim 1, wherein the means for driving the gear box is a hydraulic motor.

* * * * *